US012559165B2

(12) United States Patent
Jeong

(10) Patent No.: US 12,559,165 B2
(45) Date of Patent: Feb. 24, 2026

(54) APPARATUS AND METHOD FOR CONTROLLING STEERING OF HOST VEHICLE

(71) Applicant: HL MANDO CORPORATION, Gyeonggi-do (KR)

(72) Inventor: Yeongjin Jeong, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 52 days.

(21) Appl. No.: 18/421,964

(22) Filed: Jan. 24, 2024

(65) Prior Publication Data

US 2024/0308573 A1     Sep. 19, 2024

(30) Foreign Application Priority Data

Mar. 15, 2023     (KR) ........................ 10-2023-0033608

(51) Int. Cl.
*B62D 5/04*              (2006.01)
(52) U.S. Cl.
CPC .................................. *B62D 5/0463* (2013.01)
(58) Field of Classification Search
CPC .... B62D 5/0463; B62D 5/049; B62D 5/0484; B62D 5/0493; B62D 6/10; B60Y 2306/13
See application file for complete search history.

(56) References Cited

U.S. PATENT DOCUMENTS

| | | | | |
|---|---|---|---|---|
| 11,623,688 B2 * | 4/2023 | Kim | ..................... | B62D 5/0484 |
| | | | | 701/41 |
| 2016/0121923 A1 * | 5/2016 | Maeda | ................. | B62D 5/0481 |
| | | | | 701/41 |
| 2017/0349207 A1 * | 12/2017 | Maeshima | ............ | B60L 3/0092 |

FOREIGN PATENT DOCUMENTS

KR          10-0155431          10/1998

OTHER PUBLICATIONS

Office Action dated Dec. 6, 2024 for Korean Patent Application No. 10-2023-0033608 and its English translation by Google Translate.

* cited by examiner

*Primary Examiner* — Phutthiwat Wongwian
(74) *Attorney, Agent, or Firm* — WOMBLE BOND DICKINSON (US) LLP

(57)          ABSTRACT
The present disclosure provides an apparatus for controlling steering, including a torque sensor for generating steering torque information by detecting a steering torque of a vehicle, a vehicle speed sensor for generating traveling speed information by detecting a driving speed of the vehicle, a steering angle sensor for generating steering angle information by detecting a steering angle of the vehicle, first and second controllers that are communicatively connected to the sensor, vehicle speed sensor and steering angle sensor, and a steering motor which is controlled by at least one of the first and second controllers, wherein the first or second controller calculates target currents including a plurality of control currents based on at least one of steering torque information, traveling speed information and steering angle information, and controls the steering motor according to the size of the target currents or the types of the plurality of control currents.

15 Claims, 5 Drawing Sheets

APPARATUS AND METHOD FOR CONTROLLING STEERING OF HOST VEHICLE

CROSS-REFERENCE TO RELATED APPLICATION

This application claims priority to and the benefit of Korean Patent Application No. 10-2023-0033608, filed on Mar. 15, 2023, the disclosure of which is incorporated herein by reference in its entirety.

BACKGROUND

1. Field of the Invention

The present disclosure relates to an apparatus and method for controlling the steering of a host vehicle, and more specifically to an apparatus and method for controlling steering in a redundancy structure.

2. Discussion of Related Art

The steering apparatus is used as an apparatus for controlling the driving direction of a vehicle, and recently, the electric power steering (hereinafter, referred to as 'EPS') apparatus that provides a steering force required by a steering motor according to electronic control has been widely used.

Such an EPS steering apparatus operates to rotate a steering column or move a rack bar connected thereto by driving an EPS steering motor according to the steering torque applied to a steering wheel by a driver.

To this end, the EPS steering apparatus includes an EPS steering motor and a steering ECU (electronic control unit) that controls the steering motor, and a constant reduction gear is connected to the steering motor, and the reduction gear operates in conjunction with the steering column or rack bar.

Meanwhile, in autonomous vehicles which have recently been actively developed, the vehicle control unit generates a steering command by itself to operate a steering apparatus regardless of the driver's intention to steering.

Even if a fail occurs, the above-described EPS steering apparatus can perform the basic steering functions because the steering column and the rack bar are mechanically connected.

On the other hand, since there may be no driver's intervention in the steering system of an autonomous vehicle, if a fail occurs in the steering system, particularly, in the ECU of the steering apparatus, the steering control becomes impossible, and as a result, it can pose a great risk.

For this reason, the recent steering systems have introduced a method of guaranteeing redundancy in preparation for the fail of a steering ECU, and to this end, the steering ECU further includes a sub ECU as a redundancy structure of the main ECU.

Specifically, while both of the main ECU and the sub ECU are normal, the main ECU calculates a target current based on at least one of the vehicle's steering torque, driving speed and steering angle, and operates the EPS steering motor by supplying a current corresponding to ½ of the target current to the EPS steering motor, and supplying a current corresponding to ½ of the remaining target current by the sub ECU.

If a fail occurs in any one of the main ECU or the sub ECU, redundancy is guaranteed by driving the EPS steering motor with the other one.

In this way, by providing a fail-safe function when the malfunction of a steering ECU occurs, it is possible to secure steering stability in an autonomous vehicle or the like.

However, when both of the main ECU and the sub steering ECU are normal, the main ECU transmits a current command corresponding to ½ of the target current to the sub ECU, and the sub ECU drives the EPS steering motor with a current according to the current command, and thus, a communication delay occurs in the process of delivering a current command. This causes a reduction in steering feel in the on-center area of a steering wheel, and there is a problem in that it is vulnerable to vibration, oscillation and the like.

SUMMARY OF THE INVENTION

An object of the present disclosure is to secure steering stability in an autonomous vehicle or the like by providing a fail-safe function when the malfunction of a steering ECU occurs.

In addition, an object of the present disclosure is to prevent a reduction in steering feel in the on-center area of a steering wheel by removing a communication delay when controlling a steering motor.

The technical problems to be achieved in the present disclosure are not limited to the above-mentioned technical problems, and other technical problems that are not mentioned will be clearly understood by those skilled in the art from the description below.

In order to achieve the above-described objects, the present disclosure provides an apparatus for controlling the steering of a host vehicle, including a torque sensor for generating steering torque information by detecting a steering torque of a host vehicle; a vehicle speed sensor for generating traveling speed information by detecting a driving speed of the host vehicle; a steering angle sensor for generating steering angle information by detecting a steering angle of the host vehicle; first and second controllers that are communicatively connected to the sensor, the vehicle speed sensor and the steering angle sensor; and a steering motor which is controlled by at least one of the first and second controllers, wherein the first or second controller calculates target currents including a plurality of control currents based on at least one of the steering torque information, the traveling speed information and the steering angle information, and controls the steering motor according to the size of the target currents or the types of the plurality of control currents.

Herein, the first controller may supply the target current to the steering motor based on the fact that the target current is less than or equal to a limit current.

In addition, the first controller may supply a limit current to the steering motor based on the fact that the target current exceeds the limit current.

In addition, the first controller may calculate an excess current obtained by subtracting the limit current from the target current based on the fact that the target current exceeds the limit current.

In addition, the first controller may transmit a command signal corresponding to the excess current to the second controller.

In addition, the second controller may receive the command signal and supplies the excess current to the steering motor.

3

In addition, the plurality of control currents may include a frictional force compensation control current, an inertia compensation control current, an assist control current, a damping compensation control current and a restoration control current.

In addition, the first controller may calculate a first target current that is the sum of the frictional force compensation control current and the inertia compensation control current, and calculate a second target current that is the sum of the assist control current, the damping compensation control current and the restoration control current.

In addition, the first controller may supply the first target current to the steering motor, and the second controller may supply the second target current to the steering motor.

In addition, the second controller may supply the second target current based on the fact that the second target current is less than or equal to a limit current, and supply the limit current to the steering motor when the second target current exceeds the limit current.

In addition, the second controller may calculate an excess current obtained by subtracting the limit current from the second target current based on the fact that the second target current exceeds a limit current.

In addition, the second controller may transmit a command signal corresponding to the excess current to the first controller.

In addition, the first controller may receive the command signal and supply the excess current to the steering motor.

In addition, the present disclosure may provide a method for controlling the steering of a host vehicle, including the steps of determining whether the first and second controllers are normal; calculating, by the first controller, a target current based on at least one of steering torque information, speed information and steering angle information of a host vehicle based on the fact that both of the first and second controllers are normal; comparing, by the first controller, the target current with a limit current; supplying, by the first controller, the target current to a steering motor based on the fact that the target current is less than or equal to a limit current, and supplying, by the first controller, the limit current to the steering motor based on the fact that the target current exceeds a limit current; and supplying, by the second controller, an excess current obtained by subtracting the limit current from the target current.

Herein, the step of supplying, by the second controller, the excess current may include the steps of calculating, by the first controller, an excess current obtained by subtracting the limit current from the target current based on the fact that the target current exceeds a limit current; transmitting, by the first controller, a command signal corresponding to the excess current to the second controller; and receiving, by the second controller, the command signal and supplying the excess current to the steering motor.

In addition, the present disclosure provides a method for controlling the steering of a host vehicle, including the steps of determining whether the first and second controllers are normal; calculating, by the first controller, a first target current that is the sum of a frictional force compensation control current and an inertia compensation control current, and calculating a second target current that is the sum of an assist control current, a damping compensation control current and a restoration control current based on at least one of steering torque information, speed information and steering angle information of a host vehicle based on the fact that both of the first and second controllers are normal; and supplying, by the first controller, the first target current to the steering motor, and supplying, by the second controller, the second target current to the steering motor.

Herein, the step of supplying, by the second controller, the second target current may be a step of supplying the second target current to the steering motor based on the fact that the second target current is less than or equal to the limit current, and supplying the limit current to the steering motor when the second target current exceeds the limit current.

In addition, the step of supplying, by the second controller, the second target current may include the steps of calculating, by the second controller, an excess current obtained by subtracting the limit current from the second target current based on the fact that the second target current exceeds a limit current; transmitting, by the second controller, a command signal corresponding to the excess current to the first controller; and receiving, by the first controller, the command signal and supplying the excess current to the steering motor.

According to the present disclosure, it is possible to secure steering stability in an autonomous vehicle or the like by providing a fail-safe function when the malfunction of a steering ECU occurs.

In addition, according to the present disclosure, it has the effect of preventing a reduction in steering feel in the on-center area of a steering wheel by removing a communication delay when controlling a steering motor.

The effects that can be obtained in the present disclosure are not limited to the effects mentioned above, and other effects that are not mentioned will be clearly understood by those skilled in the art from the description below.

DETAILED DESCRIPTION OF THE EMBODIMENTS

The above objects and means of the present disclosure and the effects thereof will become clearer through the following detailed description in relation to the accompanying drawings, and accordingly, those skilled in the art to which the present disclosure pertains will be able to easily practice the technical idea of the present disclosure. Further, in terms of describing the present disclosure, if it is determined that the detailed description of a known technique related to the present disclosure may unnecessarily obscure the gist of the present disclosure, the detailed description thereof will be omitted.

In the present specification, terms such as "or" and "at least one of" may represent one of the words listed together, or a combination of two or more. For example, "A or B" and "at least one of A and B" may include only one of A or B, or may include both of A and B.

In the present specification, terms such as 'first' and 'second' may be used to describe various elements, but the elements should not be limited by the above terms. In addition, the above terms should not be interpreted as limiting the order of each element, and may be used for the purpose of distinguishing one element from another. For example, a 'first element' may be named a 'second element', and similarly, a 'second element' may also be named a 'first element.'

Figure 1:
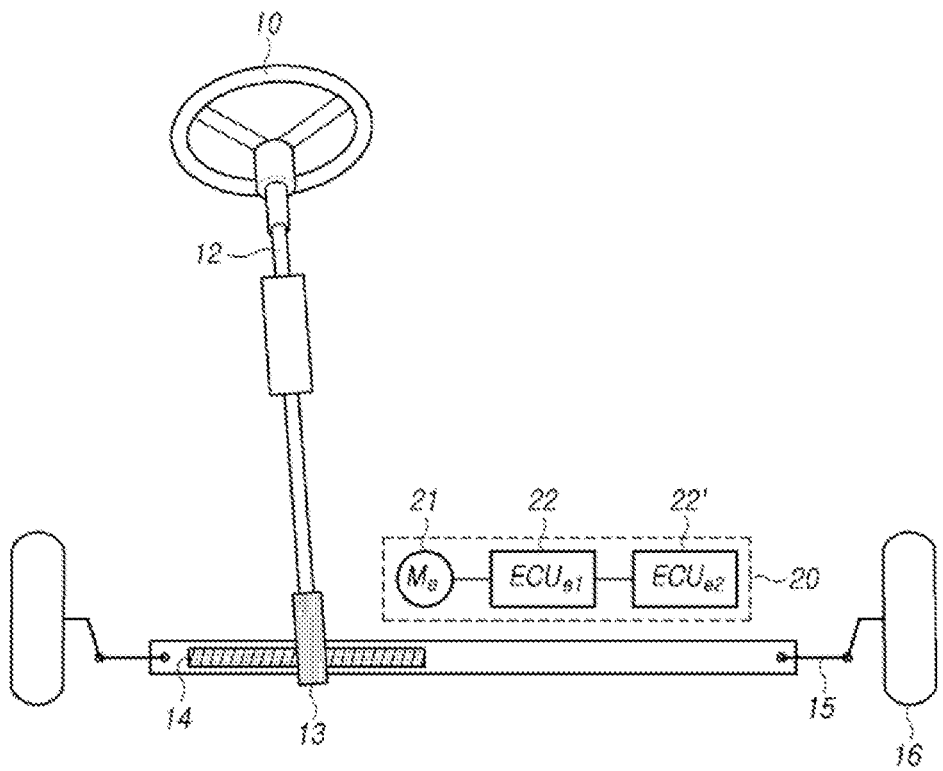
FIG. 1 is a diagram illustrating the steering system of a vehicle according to the first example of the present disclosure.

FIG. 1 is a diagram illustrating the steering system of a vehicle according to the first example of the present disclosure.

Referring to FIG. 1, the steering system of a vehicle according to the first example of the present disclosure includes a steering wheel 10 and a steering column 12 which is connected to the steering wheel 10, and a steering column assembly formed with a pinion gear 13 is provided at the other end of the steering column 12.

In addition, the steering system of a vehicle includes a rack bar 14 having a rack gear coupled to the pinion gear 13, and left and right wheels 16 are connected to the left and right sides of the rack bar 14 through tie rods 15.

In the steering system of such a vehicle, when the driver rotates the steering wheel 10, the gear structure which is coupled with the steering column 12 moves the rack bar 14 left and right, and the direction of wheels 16 is changed accordingly.

Meanwhile, the EPS steering apparatus includes an EPS steering motor 21 (Me) to assist the driver's steering, and the EPS steering motor 21 rotates the steering column 12 through a constant gear reduction structure (not illustrated) or provides an auxiliary steering force for moving the rack bar 14.

One or more steering ECUs may be used to control the driving of the EPS steering motor 21. For example, the first steering ECU 22 (ECUe1) and the second steering ECU 22' (ECUe2) may basically control the EPS steering motor 21.

Meanwhile, in autonomous vehicles which have recently been actively developed, a vehicle control unit automatically generates a steering command to operate a steering apparatus regardless of the driver's intention to steering.

The EPS steering apparatus as shown in FIG. 1 may perform a basic steering function even if a fail occurs because the steering column 13 and the rack bar 14 are mechanically connected. However, since there may be no driver's intervention in the steering system of an autonomous vehicle, when a fail occurs in the steering system, particularly, in the ECU of the steering apparatus, steering control becomes impossible, and as a result, it may pose a great risk.

For this reason, the recent steering systems have introduced a method of guaranteeing redundancy in preparation for a fail of the steering ECU, and to this end, as shown in FIG. 1, the steering ECU 20 is further provided with a second steering ECU 22' (ECUe2) as a redundancy structure.

Specifically, while both of the first steering ECU 22 (ECUe1) and the second steering ECU 22' (ECUe2) are normal, the first steering ECU 22 (ECUe1) calculates a target current based on at least one of the steering torque, travel speed and steering angle of a vehicle, supplies a current corresponding to ½ of the target current to the EPS steering motor 21 (Me), and supplies a current corresponding to ½ of the remaining target current to the second steering ECU 22' (ECUe2) so as to drive the EPS steering motor 21 (Me).

If a fail occurs in any one the first steering ECU 22 (ECUe1) or the second steering ECU 22' (ECUe2), redundancy is guaranteed by driving the EPS steering motor 21 (Me) with the other one. Herein, the first steering ECU 22 (ECUe1) may operate as a main ECU, and the second steering ECU 22' (ECUe2) may operate as a sub ECU.

In this way, by providing a fail-safe function when a fail of the steering ECU occurs, it is possible to secure steering stability in an autonomous vehicle or the like.

However, when both of the first steering ECU 22 (ECUe1) and the second steering ECU 22' (ECUe2) are normal, the first steering ECU 22 (ECUe1) transmits a current command corresponding to ½ of the target current to the second steering ECU 22' (ECUe1), and since the second steering ECU 22' (ECUe2) drives the EPS steering motor 21 (Me) with a current according to the current command, a communication delay occurs in the process of transmitting the current command. This causes a reduction in steering feel in the on-center area of the steering wheel 10, and there is a problem in that it is vulnerable to vibration and vibration.

For example, the first steering ECU 22 (ECUe1) first supplies a current corresponding to ½ of the target current to the EPS steering motor 21 (Me), and then, the second steering ECU 22' (ECUe2) receives a current command from the first steering ECU 22 (ECUe1) and supplies a current corresponding to ½ of the target current to the EPS steering motor 21 (Me) later such that a communication delay of about 2 ms occurs.

Figure 2:
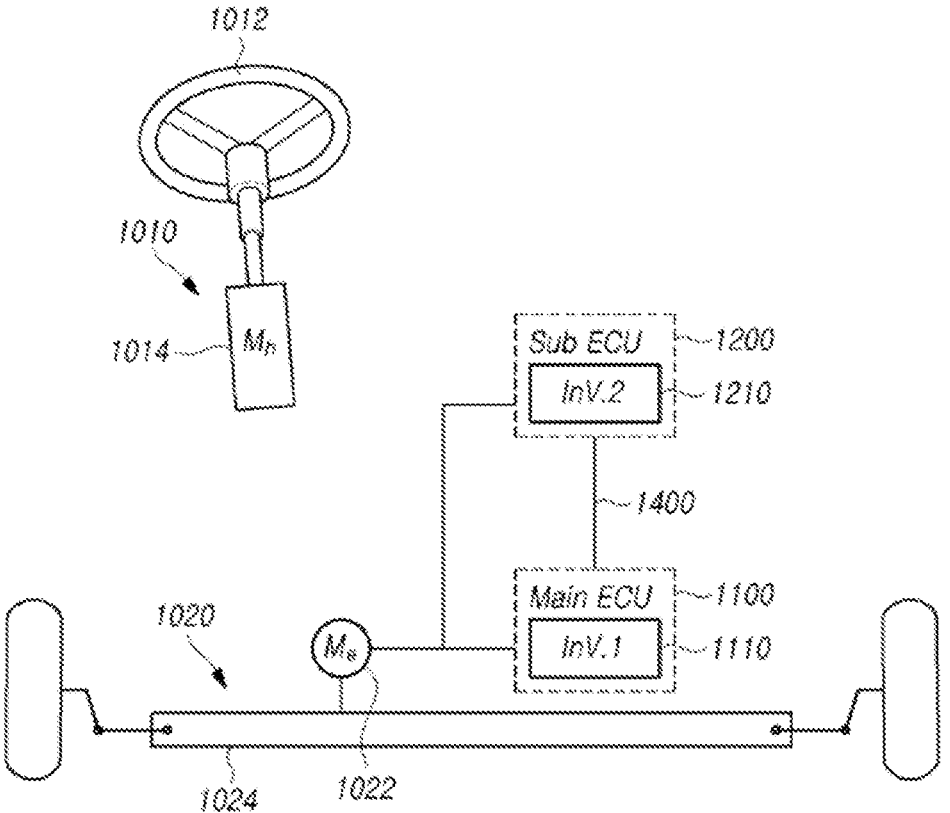
FIG. 2 is a diagram illustrating the steering system of a vehicle according to the second example of the present disclosure.

FIG. 2 is a diagram illustrating the steering system of a vehicle according to the second example of the present disclosure.

The steering system according to the second example of the present disclosure illustrates a case in which the steering apparatus of a steer-by-wire (SBW) type is applied.

Referring to FIG. 2, the SBW steering apparatus includes a steering wheel-side assembly 1010 and a driving-side assembly 1020, and the steering wheel-side assembly 1010 and the driving-side assembly 1020 are mechanically separated.

In addition to the steering wheel 1012 and the steering column, the steering wheel-side assembly 1010 may include a reaction force motor 1014 (Mh) for providing a steering feel (vibration, etc.) according to steering to the steering wheel 1012.

Meanwhile, the driving-side assembly 1020 of the SBW steering apparatus may include an EPS steering motor 1022 (Me) for SBW steering that is linked to a rack bar 1024 by using a rack screw device and the like, and a main ECU 1100 and a sub ECU 1200 for controlling the EPS steering motor 1022 (Me).

In addition, the main ECU 1100 may include a first inverter 1110, and the sub ECU 1200 may include a second inverter 1210. Herein, the first inverter 1110 and the second inverter 1210 may drive the EPS steering motor 1022 (Me) by supplying a current to the EPS steering motor 1022 (Me).

In the SBW steering apparatus as shown in FIG. 2, if a fail occurs, steering control is impossible when a fail occurs in the steering ECU because the steering wheel-side assembly 1010 and the driving-side assembly 1020 are not mechanically connected, and as a result, it may pose a great risk.

For this reason, the recent SBW steering system introduces a method of guaranteeing redundancy in preparation for the fail of a steering ECU, and to this end, as shown in FIG. 2, the steering ECU further includes a sub ECU 1200 as a redundancy structure of the main ECU 1100.

Specifically, while both of the main ECU 1100 and the sub ECU 1200 are normal, the main ECU 1100 calculates a target current based on at least one of steering torque, driving speed and steering angle of the vehicle, and supplies a current corresponding to ½ of the target current to the EPS steering motor 1022 (Me), and the EPS steering motor 1022 is driven by having the sub ECU 1200 supply a current corresponding to ½ of the remaining target current.

If a fail occurs in any one of the main ECU 1100 and the sub ECU 1200, redundancy is guaranteed by driving the EPS steering motor 1022 with the other one.

In this way, by providing a fail-safe function when a fail of the steering ECU occurs, it is possible to secure steering stability in an autonomous vehicle or the like. However, when both of the main ECU 1100 and the sub steering ECU 1200 are normal, the main ECU 1100 transmits a current command corresponding to ½ of the target current to the sub ECU 1200, and since the sub ECU 1200 drives the EPS steering motor 1022 with a current according to the current command, a communication delay occurs in the process of transmitting the current command.

This causes a reduction in steering feel in the on-center area of the steering wheel, and there is a problem in that it is vulnerable to vibration and oscillation. Herein, the on-center area means an area in which the driver drives at a relatively small angle and torque condition with respect to the center of the steering wheel.

For example, after the main ECU 1100 first supplies a current corresponding to ½ of the target current to the EPS steering motor 1022, the sub ECU 1200 receives a current command from the main ECU 1100, and then, by supplying a current corresponding to ½ of the target current later to the EPS steering motor 21 (Me), a communication delay of about 2 ms occurs.

Figure 3:
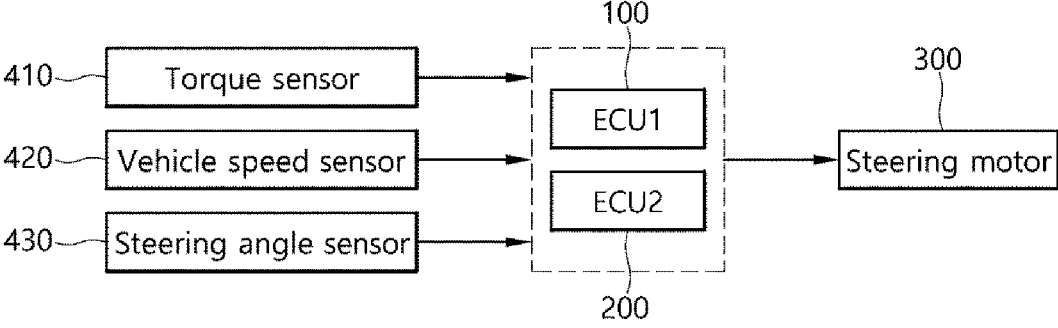
FIG. 3 is a block diagram of the apparatus for controlling steering according to an exemplary embodiment of the present disclosure.
Figure 4:
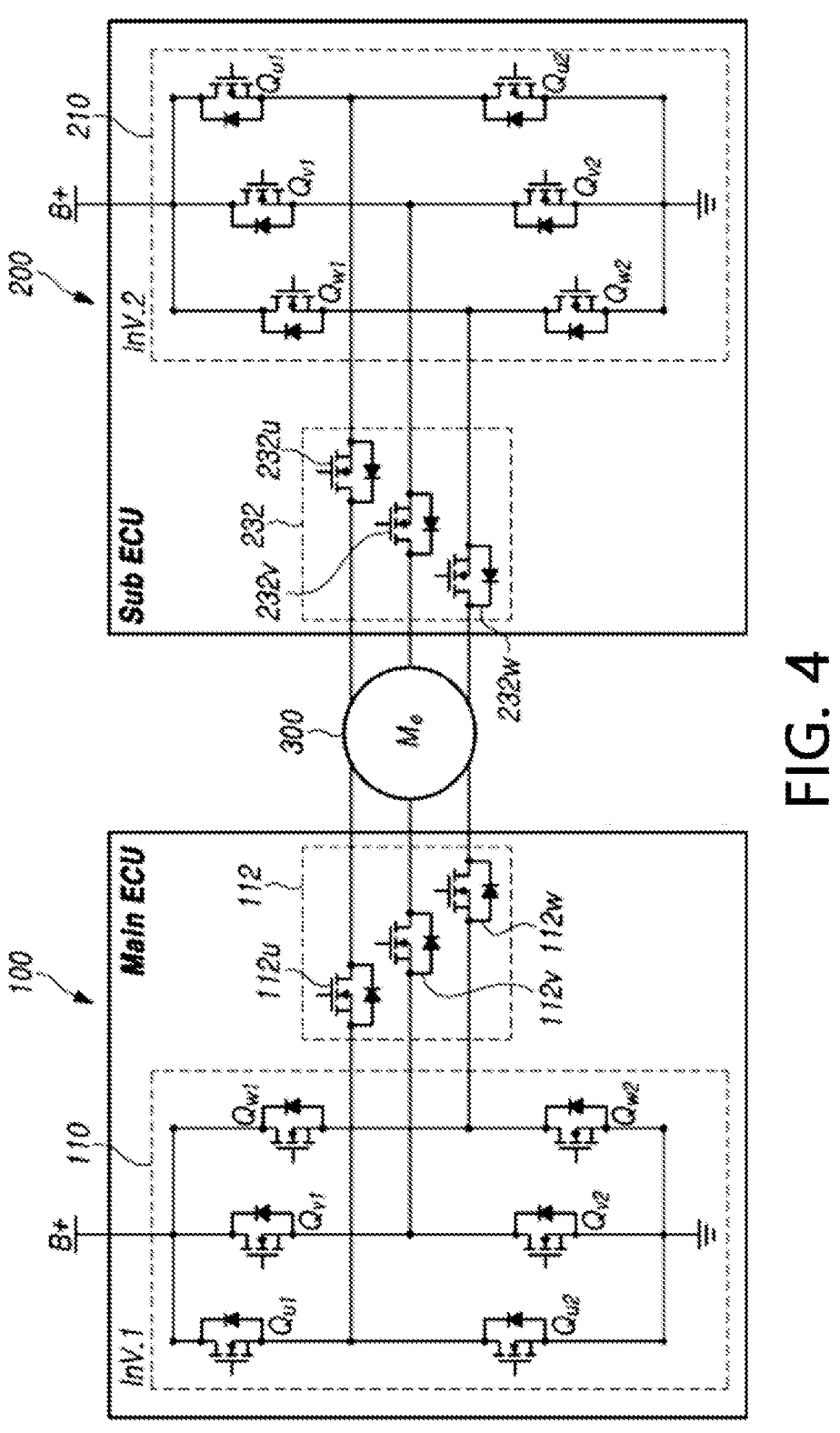
FIG. 4 is a circuit diagram of first and second controllers provided in the apparatus for controlling steering according to an exemplary embodiment of the present disclosure.

FIG. 3 is a block diagram of the apparatus for controlling steering according to an exemplary embodiment of the present disclosure, and FIG. 4 is a circuit diagram of first and second controllers provided in the apparatus for controlling steering according to an exemplary embodiment of the present disclosure.

The apparatus for controlling steering described below can be applied to both of the steering apparatuses of the first and second examples of the present disclosure as described above.

Referring to FIG. 3, the apparatus for controlling steering according to an exemplary embodiment of the present disclosure may be configured by including a torque sensor 410, a vehicle speed sensor 420, a steering angle sensor 430, a first controller 100, a second controller 200 and a steering motor 300.

The torque sensor 410 may generate steering torque information by detecting the steering torque of a vehicle, and may provide the steering torque information to at least one of the first controller 100 and the second controller 200.

The vehicle speed sensor 420 may generate driving speed information by detecting the driving speed of a vehicle, and may provide the driving speed information to at least one of the first controller 100 and the second controller 200.

The steering angle sensor 430 may generate steering angle information by detecting the steering angle of a vehicle, and may provide the steering angle information to at least one of the first controller 100 and the second controller 200.

The first controller 100 and the second controller 200 may be communicatively connected to the torque sensor 410, the vehicle speed sensor 420 and the steering angle sensor 430.

The steering motor 300 may be controlled by at least one of the first controller 100 and the second controller 200. For example, when both of the first controller 100 and the second controller 200 are normal, the first controller 100 and the second controller 200 may respectively control the steering motor 300, and when any one of the first controller 100 and the second controller 200 fails, the remaining normal controller may control the steering motor 300 alone.

Referring to FIG. 4, the apparatus for controlling steering includes a steering motor 300 (Me) which is connected to a first inverter 110 and a second inverter 210, and the first inverter 110, and may include a first controller 100 (Main ECU) which includes a first inverter 110 and controls the steering motor 300 through the first inverter 110, and a second controller 200 (Sub ECU) which includes a second inverter 210 and controls the steering motor 300 through the second inverter 210.

Specifically, when the second controller 200 operates normally, the first controller 100 controls the steering motor 300 through the first inverter 110 together with the second controller 200, and in the event of an error or fail in the second controller 200, the steering motor 300 may be controlled independently through the first inverter 110.

The first controller 100 may include a first switching part 112 that is disposed between the first inverter 110 and the steering motor 300.

Specifically, after the first controller 100 turns on the first switching part 112, when the second controller 200 is in a normal state, the first inverter 110 is controlled to supply a current corresponding to ½ of the target current to the steering motor 300, and when an error occurs in the second controller 200, the first inverter 110 is controlled to supply a target current within a range that does not exceed the limit current to the steering motor 300. Herein, the target current may be calculated by the first controller 100 based on steering angle information, steering torque information and traveling speed information, and the limit current may mean a maximum current that the first inverter 110 can output.

In addition, the apparatus for controlling steering according to an exemplary embodiment of the present disclosure may further include an anomaly detection part (not illustrated) for detecting an anomaly of the second controller 200.

The anomaly detection part measures the input/output voltage or current of the steering motor 300 and compares the value with a current command or a reference value, thereby confirming whether the second controller 200 is operating normally.

For example, the anomaly detection part may be implemented with a shunt resistor that is connected to the output wire of the steering motor 300, and it may measure a voltage or current at both ends of the shunt resistor, and compare the same with the voltage and current values corresponding to the reference value or current command, but the present disclosure is not limited thereto.

When the first controller 100 operates normally, the second controller 200 controls the steering motor 300 through the second inverter 210 together with the first controller 100, and when the first controller 100 is abnormal or fails, it may independently control the steering motor 300 through the second inverter 210.

The second controller 200 may include a second switching part 232 which is disposed between the second inverter 210 and the steering motor 300.

Specifically, after the second controller 200 turns on the second switching part 232, when the first controller 100 is in a normal state, the second inverter 210 is controlled to supply a current corresponding to ½ of the target current to the steering motor 300, and when an error occurs in the first controller 100, the second inverter 210 is controlled to supply a target current within a range that does not exceed the limit current to the steering motor 300. Herein, the target current may be calculated by the second controller 200 based on steering angle information, steering torque information and traveling speed information, and the limit current may mean a maximum current that the second inverter 210 can output.

The steering motor 300 is a single winding motor and may be a 3-phase motor driven by a 3-phase control current, but the present disclosure is not limited thereto.

The first inverter 110 may convert the direct current (DC) supply voltage of a battery to alternating current (AC) or apply the alternating voltage (or alternating current) to the steering motor 300. Specifically, the first inverter 110 may convert the supply voltage of a battery into AC and apply the AC voltage or current to each phase of the steering motor 300.

Specifically, the first inverter 110 may be implemented as a bridge circuit including six switches that are disposed at both ends of the power supply.

That is, the first inverter 110 may be an H-bridge circuit structure in which an upper u current FET (Qu1) and a lower u current FET (Qu2), an upper v current FET (Qv1) and a lower v current FET (Qv1), and an upper w current FET Qw1 and a lower w current FET Qw2 are connected in parallel.

The upper u current FET (Qu1) and the lower u current FET (Qu2) lines are connected to the u phase first switch 112u of the first switching part 112, and the remaining FET lines for the v and w phases are also connected to the v and w phase first switches 112v, 112w of the first switching part 112 respectively.

When the second controller 200 is normal, the first controller 100 controls the on/off of the switch of the first inverter 110 so as to control to apply ½ of the target current to the steering motor 300.

In addition, when the second controller 200 fails, the first controller 100 controls the on/off of the switch of the first inverter 110 so as to control to apply a target current within a range that does not exceed the limit current to the steering motor 300.

Similar to the first inverter 110, the second inverter 210 may be implemented as a bridge circuit including six switches that are disposed at both ends of the power source, and since it performs the same operation as the first inverter 210 as described above, the detailed description thereof will be omitted.

In addition, the apparatus for controlling steering according to an exemplary embodiment of the present disclosure may further include an anomaly detection part (not illustrated) for detecting an anomaly of the first controller 100.

The anomaly detection part may check whether the first controller 100 is normally operating by measuring the input/output voltage or current of the steering motor 300 and comparing the value with a current command or a reference value.

For example, the anomaly detection part may be implemented with a shunt resistor that is connected to the output wire of the steering motor 300, and it may measure the voltage or current at both ends of the shunt resistor, and compare the same with the voltage and current values corresponding to the reference value or current command, but the present disclosure is not limited thereto.

Meanwhile, the first controller 100 and the second controller 200 are connected through a vehicle communication network 400 to transmit/receive signals or messages to/from each other. The vehicle communication network may use the controlled area network (CAN) communication method, but the present disclosure is not limited thereto, and a separate serial communication bus may be used.

Specifically, in the apparatus for controlling steering according to an exemplary embodiment of the present disclosure, when the second controller 200 is abnormal, the second controller 200 or the anomaly detection part may transmit an error message to the first controller 100, and the first controller 100 may control the steering motor 300 alone.

In addition, in the apparatus for controlling steering according to an exemplary embodiment of the present disclosure, when the first controller 100 is abnormal, the first controller 100 or the anomaly detection part may transmit an error message to the second controller 200, and the first controller 100 may transfer or assign the control right of the steering motor 300 to the second controller 200.

Alternatively, the second controller 200 may detect an anomaly of the first controller 100 by directly monitoring an operation of the first controller 100 through an anomaly detection part or the like. In this case, the second controller 200 may receive the control right of the steering motor 300 from the first controller 100 when an error occurs in the first controller 100.

The first controller 100 or the second controller 200 may calculate target currents including a plurality of control currents based on at least one of steering torque information, traveling speed information and steering angle information, and control the steering motor 300 according to the size of the target currents or the type of the plurality of control currents.

First of all, the method in which the first controller 100 or the second controller 200 controls the steering motor 300 according to the size of the target current will be described.

The first controller 100 may supply a target current to the steering motor 300 when the target current is less than or equal to the limit current. Herein, the target current may be calculated by the first controller 100 based on steering angle information, steering torque information and traveling speed information, and the limit current may mean a maximum current that the first inverter 110 can output.

As such, when the target current is less than or equal to the limit current, since the steering motor 300 is controlled by the first controller 100 alone, communication delay does not occur, thereby preventing a reduction in steering feel in the on-center area of the steering wheel. If the vehicle is actually driving at a medium or high speed or higher, since the target current is less than or equal to the limit current, the steering motor 300 may be controlled by the first controller 100 alone.

Unlike the above, the first controller 100 may supply a limit current to the steering motor 300 when the target current exceeds the limit current.

Herein, when the second controller 200 fails, the first controller 100 alone controls the steering motor 300.

However, when the second controller 200 is normal, the first controller 100 controls the steering motor 300 in cooperation with the second controller. To this end, when the target current exceeds the limit current, the first controller 100 may calculate the excess current obtained by subtracting the limit current from the target current.

In addition, the first controller 100 may transmit a command signal corresponding to the excess current to the second controller 200, and the second controller 200 may receive the command signal and supply the excess current to the steering motor 300.

Next, the method in which the first controller 100 or the second controller 200 controls the steering motor 300 according to the type of a plurality of control current will be described.

Herein, the plurality of control currents may include a frictional force compensation control current, an inertia compensation control current, an assist control current, a damping compensation control current and a restoration control current.

Specifically, the frictional force compensation control current is a current for compensating the frictional force generated when components included in the steering apparatus are driven, and the inertia compensation control current is a current for compensating for road surface information that is partially removed by the inertia of the steering wheel, and the assist control current is a current for generating an auxiliary steering force to assist the driver's steering, and the damping compensation control current is a current for suppressing yaw oscillation that occurs during vehicle steering and increasing a damping torque to improve flood stability, and the restoration control current is a current for restoring to a position where neutral driving is possible even if the wheel alignment is misaligned or an error in the steering angle sensor occurs.

Herein, the frictional force compensation control current and the inertia compensation control current are low-frequency outputs that do not require fast response, and the assist control current, damping compensation control current and restoration control current are high-frequency outputs that require fast response.

In the apparatus for controlling steering according to an exemplary embodiment of the present disclosure, the roles of the first controller 100 and the second controller 200 are divided according to whether a control current requires fast response. That is, the first controller 100 outputs a control current that requires fast response, and the second controller 200 outputs a control current that does not require fast response.

To this end, the first controller 100 may calculate a first target current that is the sum of the frictional force compensation control current and the inertia compensation control current, and calculate a second target current that is the sum of the assist control current, the damping compensation control current and the restoration control current.

In addition, the first controller 100 may supply a first target current to the steering motor 300, and the second controller 200 may supply a second target current to the steering motor 300.

In this way, since the first controller 100 and the second controller 200 control the steering motor 300 by dividing roles according to the type of control signal, no communication delay occurs, and thus, it is possible to prevent a reduction in steering feel in the on-center area of the steering wheel.

Meanwhile, the second controller 200 may supply a second target current when the second target current is less than or equal to the limit current, and supply a limit current to the steering motor 300 when the second target current exceeds the limit current.

When the second target current exceeds the limit current, the second controller 200 may calculate an excess current obtained by subtracting the limit current from the second target current.

In addition, the second controller 200 may transmit a command signal corresponding to the excess current to the first controller 100, and the first controller 100 may receive the command signal and supply the excess current to the steering motor 300.

Figure 5:
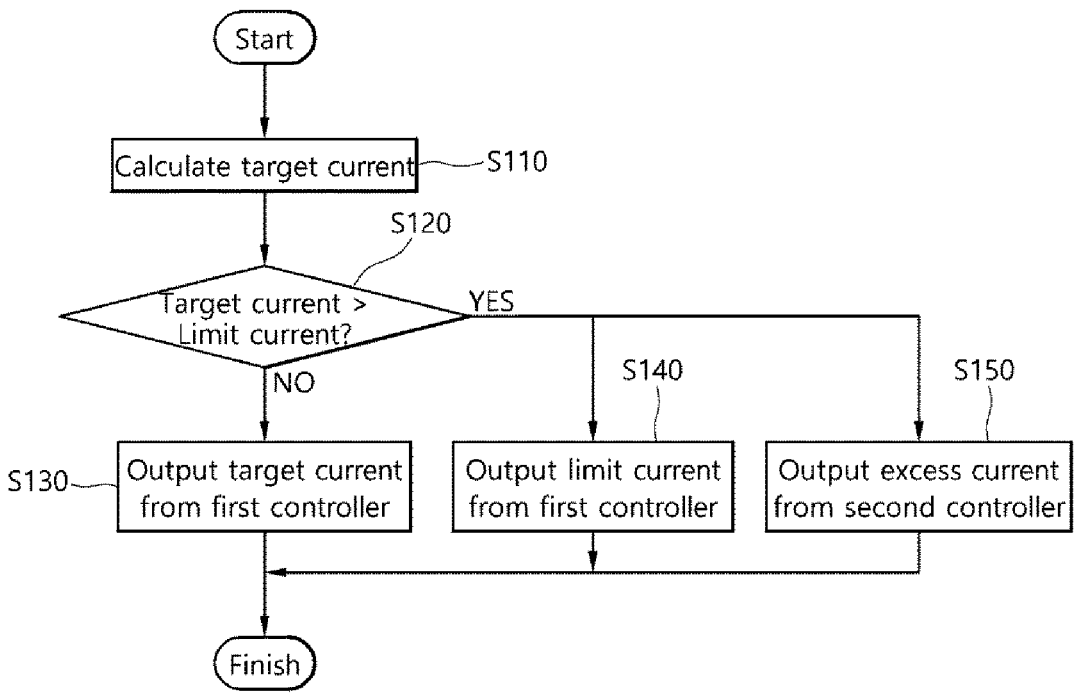
FIG. 5 is a flow chart of the method for controlling a steering motor according to the size of target currents according to an exemplary embodiment of the present disclosure.

FIG. 5 is a flow chart of the method for controlling a steering motor according to the size of target currents according to an exemplary embodiment of the present disclosure.

Referring to FIG. 5, first of all, it is determined whether the first controller 100 and the second controller 200 are normal.

Next, as a result of the determination, when both of the first controller 100 and the second controller 200 are normal, the first controller 100 calculates a target current based on at least one of steering torque information, traveling speed information and steering angle information (S110).

Next, the first controller 100 compares the target current with the limit current (S120). Herein, the limit current means the maximum current that the first inverter 110 of the first controller 100 can output.

Next, as a result of the comparison, when the target current is less than or equal to the limit current, the first controller 100 supplies the target current to the steering motor 300 (S130).

As such, when the target current is less than or equal to the limit current, since the steering motor 300 is controlled by the first controller 100 alone, communication delay does not occur, thereby preventing a reduction in steering feel in the on-center area of the steering wheel. If the vehicle is actually driving at a medium or high speed or higher, since the target current is less than or equal to the limit current, the steering motor 300 may be controlled by the first controller 100 alone.

In contrast, when the target current exceeds the limit current, the first controller 100 supplies the limit current to the steering motor 300 (S140), and the second controller 200 supplies an excess current that is obtaining by subtracts the limit current from the target current (S150).

Specifically, when the target current exceeds the limit current, the first controller 100 calculates the excess current obtained by subtracting the limit current from the target current. Then, the first controller 100 transmits a command signal corresponding to the excess current to the second controller 200. Then, the second controller 200 receives the command signal and supplies the excess current to the steering motor 300.

Figure 6:
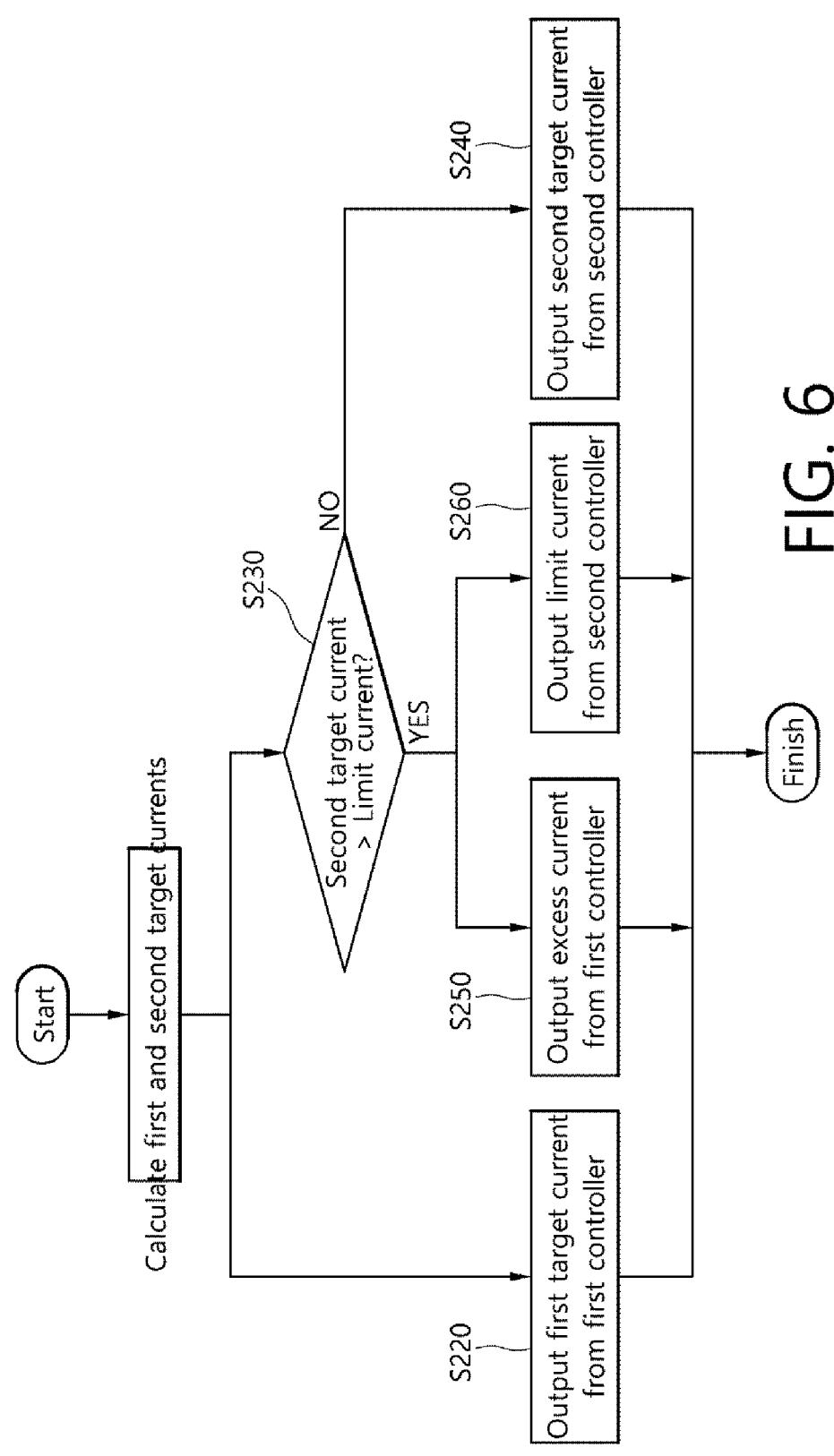
FIG. 6 is a flowchart of the method for controlling a steering motor according to the type of control currents according to an exemplary embodiment of the present disclosure.

FIG. 6 is a flowchart of the method for controlling a steering motor according to the type of control currents according to an exemplary embodiment of the present disclosure.

Referring to FIG. 6, first of all, it is determined whether the first controller 100 and the second controller 200 are normal.

Next, when both of the first controller 100 and the second controller 200 are normal, the first controller 100 calculates a first target current that is the sum of a compensation frictional force compensation control current and an inertia compensation control current based on at least one of steering torque information, traveling speed information and steering angle information, and calculates a second target current that is the sum of an assist control current, a damping compensation control current and a restoration control current (S210).

Next, the first controller 100 supplies the first target current to the steering motor 300 (S220), and the second controller 200 supplies the second target current to the steering motor 300 (S240).

In this way, since the first controller 100 and the second controller 200 control the steering motor 300 by dividing roles according to the type of control signal, no communication delay occurs, and thus, it is possible to prevent a reduction in steering feel in the on-center area of the steering wheel.

Before the second controller 200 supplies the second target current to the steering motor 300, the second target current and the limit current may be compared (S230). Herein, the limit current means the maximum current that the second inverter 210 of the second controller 200 can output.

In this case, when the second target current is less than or equal to or the limit current, the second controller 200 supplies the second target current to the steering motor 300 (S240).

In contrast, when the second target current exceeds the limit current, the limit current is supplied to the steering motor 300 (S260).

Specifically, when the second target current exceeds the limit current, the second controller 200 calculates an excess current obtained by subtracting the limit current from the second target current. Then, the second controller 200 transmits a command signal corresponding to the excess current to the first controller. Then, the first controller 100 receives the command signal and supplies the excess current to the steering motor 300 (S250).

In the detailed description of the present disclosure, specific exemplary embodiments have been described, but various modifications are possible without departing from the scope of the present disclosure. Therefore, the scope of the present disclosure is not limited to the described exemplary embodiments, and should be defined by the following claims and equivalents thereof.

What is claimed is:

1. An apparatus for controlling the steering of a host vehicle, comprising:

a torque sensor generating steering torque information by detecting a steering torque of the host vehicle;

a vehicle speed sensor generating traveling speed information by detecting a driving speed of the host vehicle;

a steering angle sensor generating steering angle information by detecting a steering angle of the host vehicle;

first and second controllers communicatively connected to the torque sensor, the vehicle speed sensor and the steering angle sensor; and a steering motor which is controlled by at least one of the first and second controllers, the first or second controller configured to:

calculate target current including a plurality of control currents based on at least one of the steering torque information, the traveling speed information and the steering angle information; and control the steering motor according to a size of the target current or types of the plurality of control currents, and the first controller configured to calculate an excess current obtained by subtracting a limit current from the target current based on a fact that the target current exceeds the limit current.

2. The apparatus of claim 1, the first controller configured to supply the target current to the steering motor based on a fact that the target current is less than or equal to the limit current.

3. The apparatus of claim 1, the first controller configured to supply the limit current to the steering motor based on the fact that the target current exceeds the limit current.

4. The apparatus of claim 1, the first controller configured to transmit a command signal corresponding to the excess current to the second controller.

5. The apparatus of claim 4, the second controller configured to receive the command signal and supply the excess current to the steering motor.

6. The apparatus of claim 1, the plurality of control currents include a frictional force compensation control current, an inertia compensation control current, an assist control current, a damping compensation control current and a restoration control current.

7. The apparatus of claim 6, the first controller configured to calculate a first target current that is a sum of the frictional force compensation control current and the inertia compensation control current, and calculate a second target current that is a sum of the assist control current, the damping compensation control current and the restoration control current.

8. The apparatus of claim 7, the first controller configured to supply the first target current to the steering motor, and the second controller configured to supply the second target current to the steering motor.

9. The apparatus of claim 8, the second controller configured to supply the second target current based on a fact that the second target current is less than or equal to the limit current, and supply the limit current to the steering motor when the second target current exceeds the limit current.

10. The apparatus of claim 9, the second controller configured to calculate an excess current obtained by subtracting the limit current from the second target current based on a fact that the second target current exceeds the limit current.

11. The apparatus of claim 10, the second controller configured to transmit a command signal corresponding to the excess current to the first controller.

12. The apparatus of claim 11, the first controller configured to receive the command signal and supplies the excess current to the steering motor.

13. A method for controlling the steering of a host vehicle, comprising the steps of:

determining whether first and second controllers are normal;

calculating, by the first controller, a target current based on at least one of steering torque information, speed information and steering angle information of the host vehicle based on a fact that both of the first and second controllers are normal;

comparing, by the first controller, the target current with a limit current;

supplying, by the first controller, the target current to a steering motor based on a fact that the target current is less than or equal to the limit current, and supplying, by the first controller, the limit current to the steering motor based on a fact that the target current exceeds the limit current; and supplying, by the second controller, an excess current obtained by subtracting the limit current from the target current, wherein the step of supplying, by the second controller, the excess current comprises the steps of:

calculating, by the first controller, an excess current obtained by subtracting the limit current from the target current based on the fact that the target current exceeds the limit current;

transmitting, by the first controller, a command signal corresponding to the excess current to the second controller; and receiving, by the second controller, the command signal and supplying the excess current to the steering motor.

14. A method for controlling the steering of a host vehicle, comprising the steps of:

determining whether first and second controllers are normal;

calculating, by the first controller, a first target current that is a sum of a frictional force compensation control current and an inertia compensation control current, and calculating a second target current that is the sum of an assist control current, a damping compensation control current and a restoration control current based on at least one of steering torque information, speed information and steering angle information of a host vehicle based on a fact that both of the first and second controllers are normal; and supplying, by the first controller, the first target current to the steering motor, and supplying, by the second controller, the second target current to the steering motor, wherein the step of supplying, by the second controller, the second target current is a step of supplying the second target current to the steering motor based on a fact that the second target current is less than or equal to the limit current, and supplying the limit current to the steering motor when the second target current exceeds the limit current.

15. The method of claim 14, wherein the step of supplying, by the second controller, the second target current comprises the steps of:

calculating, by the second controller, an excess current obtained by subtracting the limit current from the second target current based on a fact that the second target current exceeds a limit current;

transmitting, by the second controller, a command signal corresponding to the excess current to the first controller; and receiving, by the first controller, the command signal and supplying the excess current to the steering motor.

* * * * *